United States Patent Office 2,775,086
Patented Dec. 25, 1956

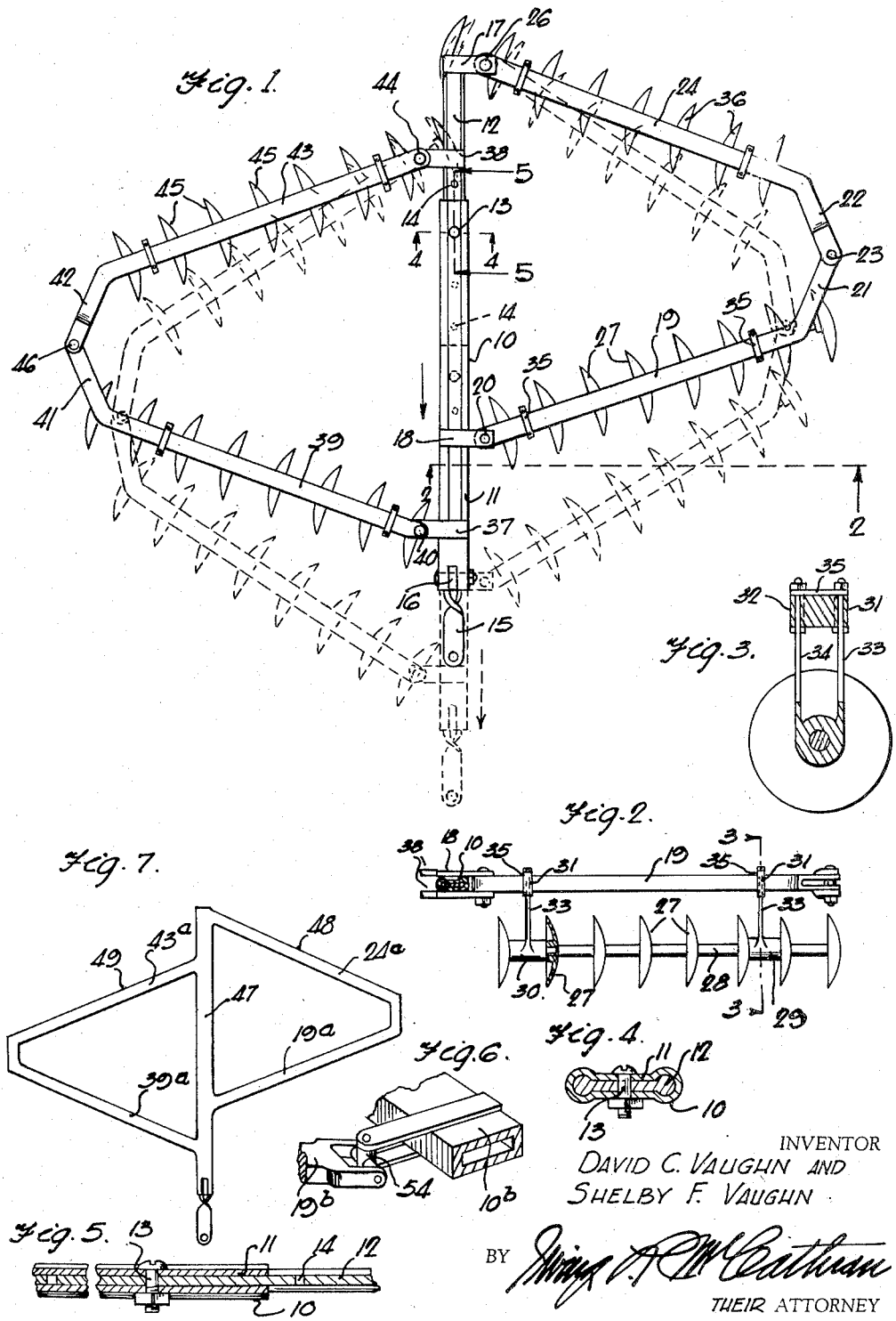

2,775,086

PLOW AND DIAMOND-SHAPED FRAME THEREFOR

David C. Vaughn and Shelby F. Vaughn, Cactus, Tex.

Application April 2, 1953, Serial No. 346,436

1 Claim. (Cl. 55—83)

This invention relates to a substantially diamond-shaped plow frame, and has for one of its objects the production of a simple and efficient two-way type disc plow which will provide for a maximum amount of leveling while plowing, and which will eliminate the objectionable side draft of a conventional disc type two-way plow.

A further object of the present invention is the production of a two-way type disc plow having a substantially diamond-shaped frame, portions of which are offset relative to each other upon opposite sides of the central draw beam, the frame carrying discs in a manner whereby two front rows of discs initially plow the soil to open furrows, and these front rows are followed by rear rows of discs which immediately fill the furrows with soil, thereby leaving the soil smooth and evenly distributed at the outer edges of the plowed soil area.

A still further object of the present invention is the production of a disc throwing the initially plowed soil inwardly toward the center of the frame defining furrows which are filled by an equal amount of soil by the rear sets or rows of discs, which latter discs throw the soil in an outward direction to produce a smooth and evenly distributed surface.

Other objects and advantages of the present invention will appear throughout the following specification and claim.

In the drawing:

Figure 1 is a top plan view of the disc plow and frame;

Figure 2 is a fragmentary sectional view taken on line 2—2 of Figure 1;

Figure 3 is an enlarged detail vertical sectional view taken on line 3—3 of Figure 2;

Figure 4 is an enlarged transverse detail sectional view taken on line 4—4 of Figure 1;

Figure 5 is an enlarged longitudinal sectional view taken on line 5—5 of Figure 1;

Figure 6 is a fragmentary perspective view of a modified type of draw-bar and universal connection for the disc supporting bars;

Figure 7 is a top plan view of a modified form of frame structure.

By referring to the drawing in detail, it will be seen that 10 designates a central draw-bar which is preferably longitudinally adjustable and comprises a forward section 11, into which the rear section 12 is slidably and adjustably fitted in the manner shown in Figure 4. An anchoring bolt 13 passes through the section 12 and is selectively fitted in one of the adjusting apertures, such as one of the apertures 14 to lock the sections in a selected longitudinally adjusted position. A draft link 15 is pivotally connected to the outer end of the draw-bar 10 for connection to a suitable tractor or other draft means. The link 15 is mounted for vertical swinging movement, as at 16. A fixed and rigid right-angularly extending hinge element 17 is carried at the rear end of the rear section 12 of the draw-bar 10, and a similar fixed hinge element 18 is carried intermediate the ends of the forward section 11.

A forward disc supporting bar 19 is pivotally connected to the hinge element 18 as at 20, and this bar 19 carries a fixed or integral rearwardly inclined arm or element 21, which arm or element 21 is pivotally or hingedly secured to the fixed forwardly inclined arm or element 22, as at 23. The arm or element 22 is integral with or fixed to the outer end of the rear disc supporting bar 24, and this bar 24 is pivotally or hingedly connected at its inner end, as at 26, to the fixed hinge element 17.

Discs 27 are suspended below the bar 19 and are carried by a suitable shaft 28. These discs are arranged in spaced relation throughout the length of the shaft 28 in a conventional manner, as shown in Figure 2. Hanger journals 29 and 30 support the shaft 28 and may be employed in any desired number and at selected locations. In most instances two hanger journals for the row of discs are sufficient, as shown in Figure 2. The supporting bar 19 is preferably provided with apertured bosses 31 and 32 upon opposite sides of the bar 19 at suitable locations. Hanger rods 33 and 34 extend through the respective bosses and are locked in position by suitable retaining nuts to rigidly suspend the discs upon the bar 19. A retaining strap 35 bridges the distance between the upper ends of the rods 33 and 34, and overlies the bar 19. Each hanger journal 29 and 30 is similarly suspended.

A series of rows of discs 36 are rigidly suspended below the bar 24 in a manner similar to that described relative to the discs 27. It should be noted that the concave face of each disc 27 faces toward the bar 10 to throw the earth inwardly whereas the rear row of discs 36 has the concave faces of the discs facing outwardly. All discs are of the conventional type which are substantially concave-convex in cross section.

A fixed hinge element 37 is carried by the section 11 of the draw-bar 10 forwardly of the hinge element 18, and a fixed hinge element 38 is carried by the section 12 of the draw-bar 10 inwardly or forwardly of the hinge element 17. A forward disc supporting bar 39 is hinged, as at 40, to the hinge element 37. The bar 39 carries a rearwardly inclined integral arm 41 at its opposite end. The arm or element 41 is hingedly connected, as at 46, to the arm or element 42. A rear disc supporting bar 43 carries the fixed or integral forwardly inclined arm or element 42, and the bar 43 is hingedly connected at its opposite end, as at 44, to the fixed hinge element 38. A row of discs 45 is suspended below the bar 43 in a similar manner as previously described and shown in detail in Figure 2 with respect to the journals and hangers, but the discs have their concave faces facing inwardly in the direction of the draw-bar 10, to throw the plowed earth inwardly. The bar 43 suspends the row of discs 45' in a similar manner as described above, and these discs 45 have their concave faces facing outwardly away from the draw-bar 10.

As shown in dotted lines in Figure 1, the draw-bar 10 may be adjusted longitudinally, and in view of the hinge connections of the bars 19, 24, 39 and 43, with the draw-bar 10 and the hinge connections 23 and 46, the bars 19, 24, 39 and 43 may be adjusted to change the angles thereof relative to the draw-bar 10, and to change the relative angular positions of the discs which are carried by the respective disc carrying bars.

As is shown in Figure 7, the substantially diamond-shaped frame of the plow may be made rigid to comprise a central draw-bar 47 having oppositely extending off-set rigid frame sections 48 and 49 fixed laterally of the draw-bar 47. A row of discs similar to that shown in Figure 1 may be suspended below the bars 19ª, 24ª, 43ª, and 39ª in a manner similar to that shown in Figures 1 and 2.

As is shown in Figure 6, the disc bars such as the bar 19ᵇ may be connected by a universal joint 54 to the draw-bar 10ᵇ to permit vertical as well as horizontal hinge or swinging movement where the plow is used upon a rough terrain. A similar universal connection may replace the hinge connections 23 and 46, if desired. Furthermore, it should be noted that the present structure is of a type wherein, in addition to the disc gangs, individual breaking plow discs, chisels, cultivator sweeps, planting attachments, as well as gage or transport wheels may be utilized within the spirit of the invention.

In the preferred form of the present invention, an adjustable substantially diamond-shaped frame is provided, consisting of four gangs of discs attached in offset relation laterally of an adjustable draw-bar, the right and left sets of gangs being hinged to the draw-bar and the front and rear sets of gangs being hingedly connected at their outer ends. The structure as shown facilitates sufficient overlapping of the inner ends of all gangs, thereby permitting them to till the soil completely through the entire width of the swath without the disc from one gang interfering with the discs of another gang at the hinged ends of the supporting bars thereof. This is due to the fact that the fixed hinge element 37 is secured to the section 11 of the draw-bar 10 forwardly in spaced relation to the fixed hinge element 18, and the fixed hinge element 38 is secured to the section 12 of the draw-bar 10 forwardly in spaced relation to the fixed hinge element 17, as shown in Figure 1. The inner disc of the bar 24 will in this manner directly trail the inner disc of the bar 43, without danger of contact or interference with each other.

It should be further noted that the adjustable diamond-shaped frame is provided with front gangs which throw an initially plowed swath of soil inwardly, defining furrows to the right and left of the central draw-bar 10. These furrows are filled by an equal amount of soil from the rear sets of gangs, which soil is thrown in an outward direction. The present device facilitates maximum leveling without ridging and without side draft, and provides a maximum strength for the gangs as well as maximum angling in either direction, and permits widest possible angles.

In connection with the present type of plow, it is important to note that since the front gang of discs is plowing in the unplowed ground, and since an angled gang has a great tendency to straighten out in draft, the second or rear gang, while running in freshly plowed ground will not offer enough resistance to counteract the straightening of the front gang to a great degree, thereby avoiding a side draft which would interfere with proper tillage. The front gangs by working in unplowed ground counteract each other, and the back gangs both in plowed ground counteract each other.

Certain detail changes in mechanical structure may be employed in the present structure within the scope of the invention, so long as these changes fall within the scope of the appended claim.

Having described the invention, what we claim as new is:

A plow of the class described comprising a frame, said frame comprising a longitudinally adjustable draw-bar, a plurality of disc-supporting bars arranged upon opposite sides of said draw-bar in converging relation thereby defining segments of a diamond-shaped frame, each segment comprising a forward disc-supporting bar and a rear disc-supporting bar adjustably connected to said draw-bar at their inner ends, the outer ends of the forward and rear bars of each segment being pivotally connected together, the adjustable connection of the disc-supporting bars with said adjustable draw-bar facilitating the adjustment of the angles of the disc-supporting bars relative to the draw-bar, said draw-bar being longitudinally adjustable to vary the length of said draw-bar, discs carried by each disc-supporting bar, the discs of the forward bars having concave faces facing toward said draw-bar to throw the earth inwardly while plowing, and the discs of the rear bars having concave faces facing outwardly away from said draw-bar to throw the earth outwardly while plowing, the discs of the rear bars crossing the furrows formed by the discs of the forward bars at a selected angle as the plow passes in a forward direction to plow criss-cross furrows as the plow passes in a forward direction.

References Cited in the file of this patent

UNITED STATES PATENTS

| Number | Name | Date |
|---|---|---|
| Re. 8,080 | Bramer et al. | Feb. 12, 1878 |
| 19,489 | Coe | Mar. 2, 1858 |
| 297,666 | Bramer | Apr. 29, 1884 |
| 310,105 | Wilson | Dec. 30, 1884 |
| 657,839 | Slaton | Sept. 11, 1900 |
| 987,887 | Knight | Mar. 28, 1911 |
| 1,084,823 | Schenck | Jan. 20, 1914 |
| 1,449,584 | Butler | Mar. 27, 1923 |
| 1,611,358 | Miller | Dec. 21, 1926 |
| 1,701,665 | Deines | Feb. 12, 1929 |
| 2,469,622 | Acton | May 10, 1949 |